United States Patent [19]

Fabricius

[11] Patent Number: 5,003,869
[45] Date of Patent: Apr. 2, 1991

[54] PROCEDURE FOR THE METERED ADDITION OF COPPER IONS IN CHEESE PRODUCTION

[75] Inventor: Claus Fabricius, Alleröd, Denmark

[73] Assignee: Mator AG, Inwil, Switzerland

[21] Appl. No.: 575,647

[22] Filed: Aug. 31, 1990

Related U.S. Application Data

[62] Division of Ser. No. 365,548, Jun. 13, 1989.

[30] Foreign Application Priority Data

Jun. 14, 1988 [CH] Switzerland .................. 2277/88

[51] Int. Cl.$^5$ .................. A23C 19/00; A23C 19/05; A23C 19/068; A01J 25/00
[52] U.S. Cl. .................................. 99/453; 99/452; 99/460; 99/466; 366/290
[58] Field of Search ............. 99/452, 453, 460, 466, 99/516, 534, 536, 451; 366/101, 290, 291; 426/40, 42, 74, 582

Primary Examiner—Timothy F. Simone
Attorney, Agent, or Firm—Wenderoth, Lind & Ponack

[57] ABSTRACT

For the metered addition of copper ions in cheese production in a stainless steel kettle (a) $CO_2$ is introduced into the added water,
(b) copper ions are produced electrolytically in the added water by means of electrodes immersed in the added water,
(c) the enzymes necessary for the cheese production are added to the added water containing $CO_2$ and copper ions and
(d) the added water containing $CO_2$, copper ions and enzymes is added to the raw milk for the cheese production.

An apparatus for carrying out this procedure is characterized by
(a) an electrolyzing tank (10) having an anode (11), a cathode (12) and a vent (13),
(b) means (1, 2, 3, 4, 6) for feeding added water into the electrolyzing tank (10),
(c) means (5, 7, 8, 9) for the metered addition of $CO_2$ to the added water,
(d) a mixing tank (16) having a mixing device (17),
(e) means (14) for draining the added water from the electrolyzing tank (10) into the mixing tank (16),
(f) means (15) for adding enzymes to the mixing tank (16),
(g) a milk kettle (19) having a mixing device (20) and
(h) means (18) for draining the added water from the mixing tank (16) into the milk kettle (18).

1 Claim, 1 Drawing Sheet

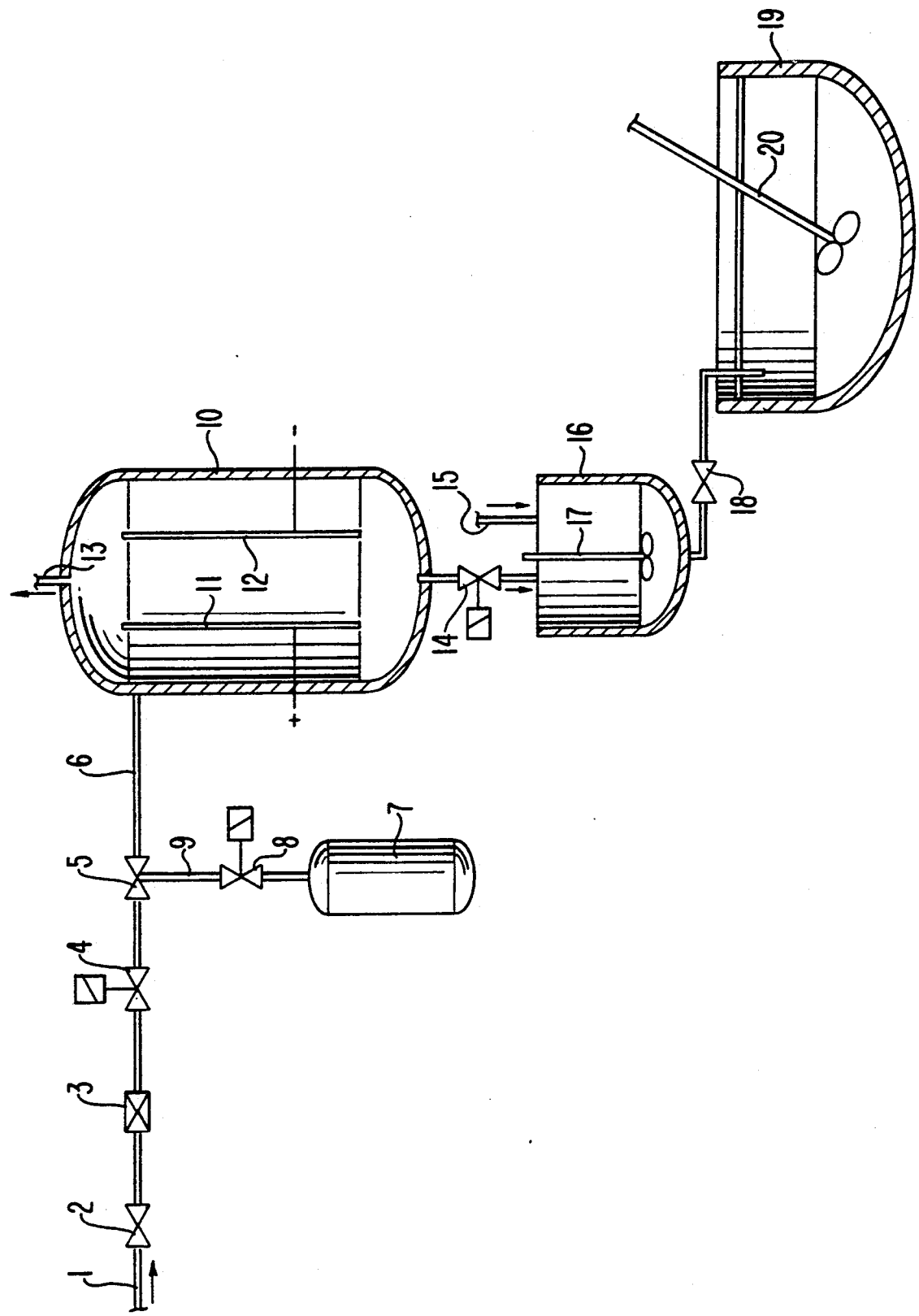

PROCEDURE FOR THE METERED ADDITION OF COPPER IONS IN CHEESE PRODUCTION

This application is a divisional application of Ser. No. 07/365,548 filed on Jun. 13, 1989.

In Switzerland, hard cheese is traditionally produced from raw milk in a copper kettle. This results in problems, on the one hand, in cleaning the copper kettles; since no acids or alkali solutions can be used, the copper kettles have to be cleaned by hand. On the other hand, owing to the relatively high copper content originating from the copper kettles, cheese factory butter has only a limited storage stability.

Since the beginnning of the fifties, attempts have therefore been made to produce hard cheese, in paticular Emmentaler, in stainless steel kettles. However, the results were unsatisfactory since, as a biochemically active metal, the copper evidently has a favourable effect on the growth of the micro-organsims responsible for the flavour production and acid production and also on the activity of the ripening enzymes. Practical experience shows that, in the production of Emmentaler in a steel kettle, defects such as after-fermentation and poor cheese taste occur owing to the absence of sufficient quantities of copper.

Attempts have therefore been made to add copper ions to the milk in the production of hard cheese in a stainless steel kettle. The metered addition of various copper salts has not proved successful since the required copper (I) salts are not soluble but are readily converted into copper (II) salts which do not have the same favourable effect on the microbiological processes as the copper (I) salts. In addition, an unsuitable quantity of the copper salt may easily be added as a result of weighing errors or the like. The electrolytic metered addition of copper ions using a copper anode which is immersed in the raw milk has also proved not to be feasible in practice since the milk coagulates at the anode in a few minutes, as a result of which the electrolytic solution of copper is completely prevented.

It has now been found that it is possible to carry out the electrolytic metered addition of copper ions in the so-called added water, that is to say, in the fresh water which is used to dissolve the enzymes for the cheese production. In that case, there is virtually no contamination of the electrodes.

At the copper anode, the copper first dissolves in the form of Cu (I) ions whose solubility can be increased by introducing $CO_2$ into the added water. In addition, the required expulsion of oxygen is promoted by the $CO_2$ dissolved in the water. Since, in general, micro-organisms which thrive in an acid medium are involved in the microbiological processes of the cheese production, these processes are also promoted by the acid pH of the added water resulting from the introduction of $CO_2$.

The procedure according to the invention for the metered addition of copper ions in cheese production in a stainless steel kettle is therefore characterized in that $CO_2$ introduced into the added water, copper ions are produced electrolytically in the added water by means of electrodes which are immersed in the added water and of which the anode is composed of copper and the cathode of copper of an inert metal, the enzymes necessary for the cheese production are added to the added water containing $CO_2$ and copper ions and the added water containing $CO_2$, copper ions and enzymes is added to the raw milk for the cheese production.

0.1 to 10 g of $CO_2$ per liter of added water can be introduced. The volume of the added water is, as a rule, 0.1 to 10% of the volume of the raw milk. Expediently, enough copper ions are produced in the added water for the raw milk to contain 0.1 to 10 mg of copper ions per liter. For this purpose, electrolysis can be carried out for 1 minute to 2 hours at a current level of 1 to 100 ampere.

The accompanying drawing shows an embodiment of an apparatus for carrying out the procedure according to the invention.

In the drawing, the added water (fresh water) is fed in at 1. The fresh water feed can be shut off by means of a shut-off valve 2 and regulated by means of a pressure regulating valve 3 and a solenoid-operated valve 4. $CO_2$ can be introduced into the added water pipe 6 via the $CO_2$ pipe 9 by means of the metered addition valve 5 from the $CO_2$ container 7 which is fitted with a solenid-operated valve 8.

The added water pipe 6 opens into an electrolysing tank 10 in which an anode 11 and a cathode 12 are provided. The electrolyzing tank 10 is fitted with a vent 13 having a level switch; the level switch shuts off the water and $CO_2$ feed when the electrolyzing tank has been filled and switches on the electrolysis by means of a timing relay. The hydrogen produced during the electrolysis is able to escape through the vent 13.

The solenoid-operated valve 14 can be used to drain the added water containing copper ions and $CO_2$ into the mixing tank 16 in which the enzymes necessary for the cheese production are added at 15 and which is fitted with a stirrer 17. The added water containing the copper ions, the $CO_2$ and the enzymes can be drained into a milk kettle 19, which is fitted with a stirrer 20, through the shut-off valve 18.

The entire procedure can be automatically controlled by means of a control box (not shown) so that incorrect operations are impossible.

The procedure according to the invention, which was carried out in the apparatus described above, is explained in more detail in the following examples.

EXAMPLES

A pushbutton switch is used to feed cold tap water (added water) via a soleniod-operated valve 4 through the pipe 6 into the electrolyzing tank 10 which contains two copper electrodes 11, 12 and has a capacity of $V_E$. At the same time, $CO_2$ is fed into the added water in a quantity of $M_{CO2}$ from the the $CO_2$ container 7 via a solenoid-operated valve 8, the pipe 9 and a metered addition valve 5.

When the electrolyzing tank 10 has been filled with the added water containing $CO_2$, the level switch incorporated in the vent pipe 13 shuts off the water and $CO_2$ feed and switches the electrolysis on. The current level $I_E$ and the electrolyzing time $t_E$ are adjusted in accordance with the value of the copper concentration $C_{Cu}$ to be reached in the raw milk.

After the electrolyzing time $t_E$ has expired, the added water containing $CO_2$ and copper ions is drained via the solenoid-operated valve 14 into the mixing tank 16, mixed with the enzyme fed in at 15 by means of the stirrer 17 and drained via the shut-off valve 18 into the milk kettle 19 which has a capacity $V_M$ and mixed therein with the raw milk by means of the stirrer 20.

The values of $V_M$, $V_E$, $M_{CO2}$, $I_E$, $t_E$ and $C_{Cu}$ for Examples 1 to 5 are specified in the following table.

TABLE

| Example | $V_M$ liters | $V_E$ % of $V_M$ | $V_E$ liters | $M_{CO_2}$ g/liter | $I_E$ ampere | $t_E$ minutes | $C_{Cu}$ mg/liters of milk |
| --- | --- | --- | --- | --- | --- | --- | --- |
| 1 | 10,000 | 0.1 | 10 | 9.5 | 50 | 1 | 0.1 |
| 2 | 40,000 | 0.5 | 200 | 10 | 100 | 40 | 2 |
| 3 | 2,000 | 2 | 40 | 8 | 10 | 60 | 6 |
| 4 | 1,000 | 7 | 70 | 0.1 | 4.2 | 120 | 10 |
| 5 | 200 | 10 | 20 | 0.7 | 1 | 90 | 9 |

I claim:

1. An apparatus for producing hard cheese using a process which comprises treating raw milk in a stainless steel kettle in the presence of copper ions, enzymes necessary for cheese production and added water to dissolve the enzymes, said apparatus comprising:
   (a) an electrolyzing tank having a vent and a means for introducing copper ions into added water comprising an anode and a cathode,
   (b) means for feeding added water into the electrolyzing tank,
   (c) means for adding a metered amount $CO_2$ to the added water,
   (d) a mixing tank having a mixing device,
   (e) means for draining the added water from the electorlyzing tank into the mixing tank,
   (f) means for adding enzyme to the mixing tank,
   (g) a milk kettle having a mixing device, and
   (h) means for draining the added water from the mixing tank into the milk kettle.

* * * * *